R. BROOKS.
MARINE HARVESTER.
APPLICATION FILED MAR. 11, 1912.

1,028,671.

Patented June 4, 1912.

3 SHEETS—SHEET 1.

Witnesses:
H. Brown
P. W. Pezzetti

Inventor
Reuben Brooks.
by Wright Brown Quimby May
Attys.

R. BROOKS.
MARINE HARVESTER.
APPLICATION FILED MAR. 11, 1912.

1,028,671.

Patented June 4, 1912.
3 SHEETS—SHEET 2.

Witnesses:
H. Brown
P. H. Pizzetta

Inventor
Reuben Brooks
by Wright Brown Quinby May
Attys

R. BROOKS.
MARINE HARVESTER.
APPLICATION FILED MAR. 11, 1912.
1,028,671.
Patented June 4, 1912.
3 SHEETS—SHEET 3.
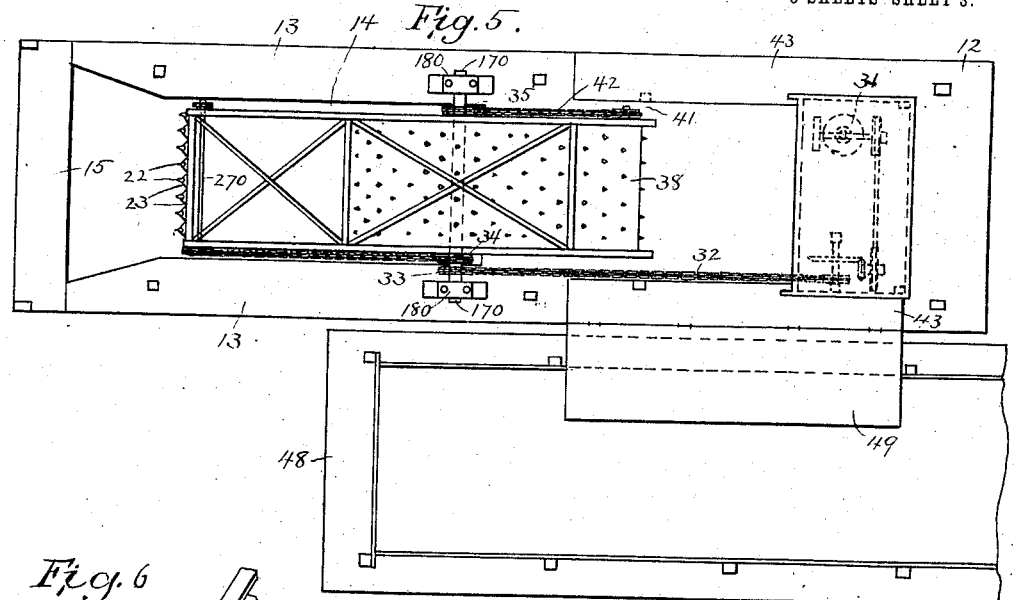
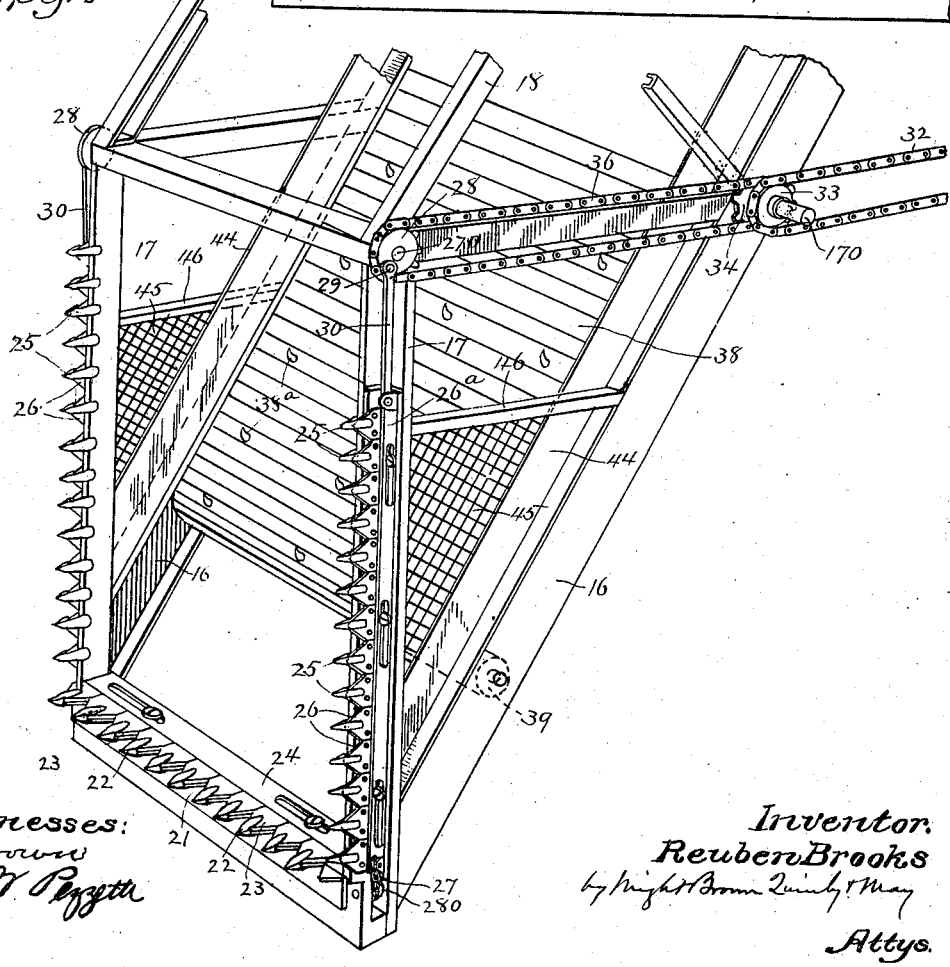
Witnesses:
Inventor,
Reuben Brooks
Attys.

UNITED STATES PATENT OFFICE.

REUBEN BROOKS, OF GLOUCESTER, MASSACHUSETTS.

MARINE HARVESTER.

1,028,671.　　　　Specification of Letters Patent.　　Patented June 4, 1912.

Application filed March 11, 1912. Serial No. 683,180.

*To all whom it may concern:*

Be it known that I, REUBEN BROOKS, a citizen of the United States, and a resident of Gloucester, in the county of Essex and State of Massachusetts, have invented certain new and useful Improvements in Marine Harvesters, of which the following is a specification.

This invention has for its object to provide a floating harvester adapted to rapidly and economically sever water growing plants below the surface of the water and to elevate the severed material above the water and deposit it on or in a floating receptacle.

The invention is embodied in a marine harvester in which are combined a floating support, such as a scow or other boat, submerged cutting mechanism adapted to sever water growing plants below the surface of the body of water on which the support floats, a partly submerged conveyer or elevator adapted to engage the severed material at a point below the surface of the water and deliver it at a point above the water and over the support so that the severed material may be conveniently stored either on the support or on an adjacent floating support, and means for simultaneously operating the cutting mechanism and the conveyer.

The invention consists in the combination of elements above recited and in various details of mechanism and construction incidental to the general purposes of my invention.

Figure 1:
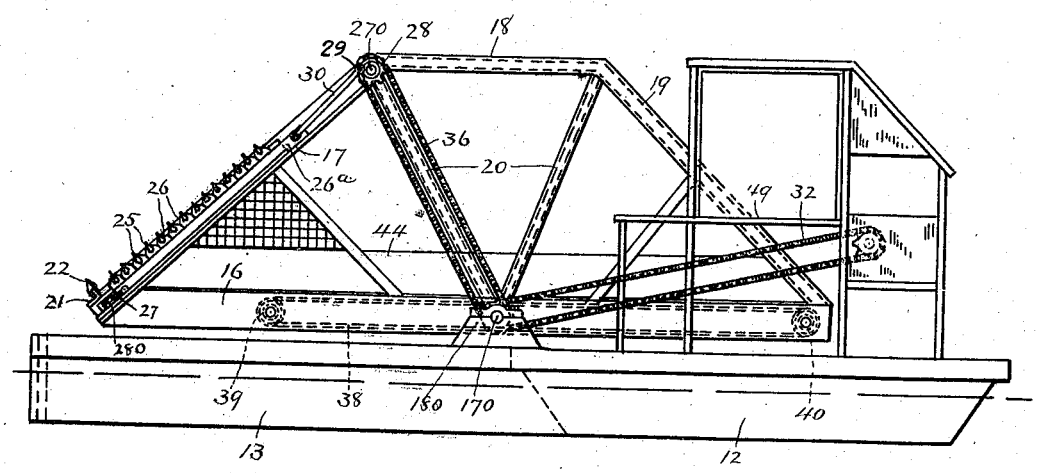
Figure 2:
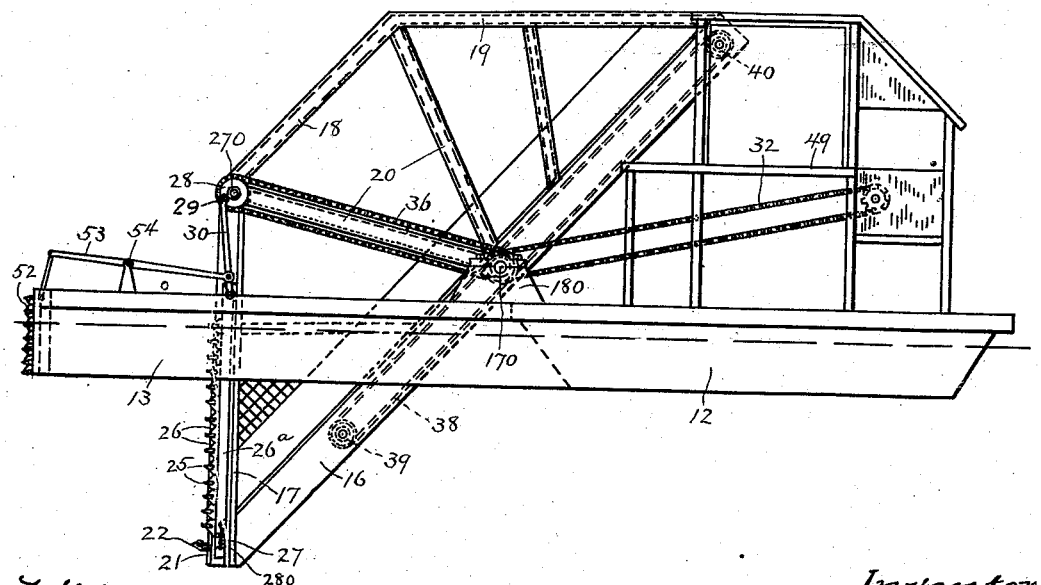
Figure 3:
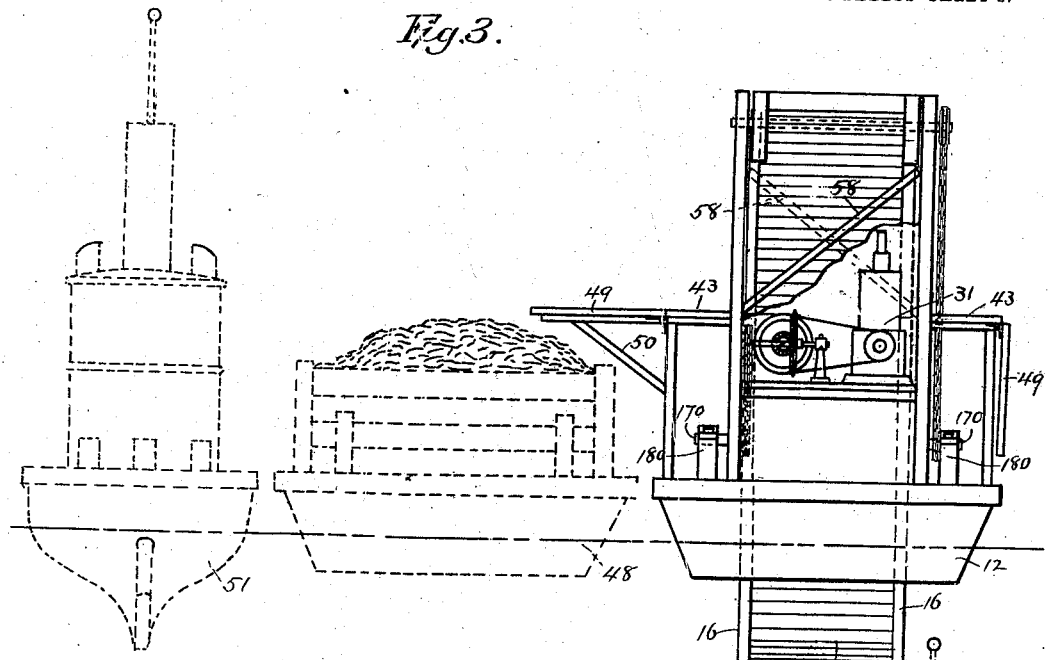
Figure 4:
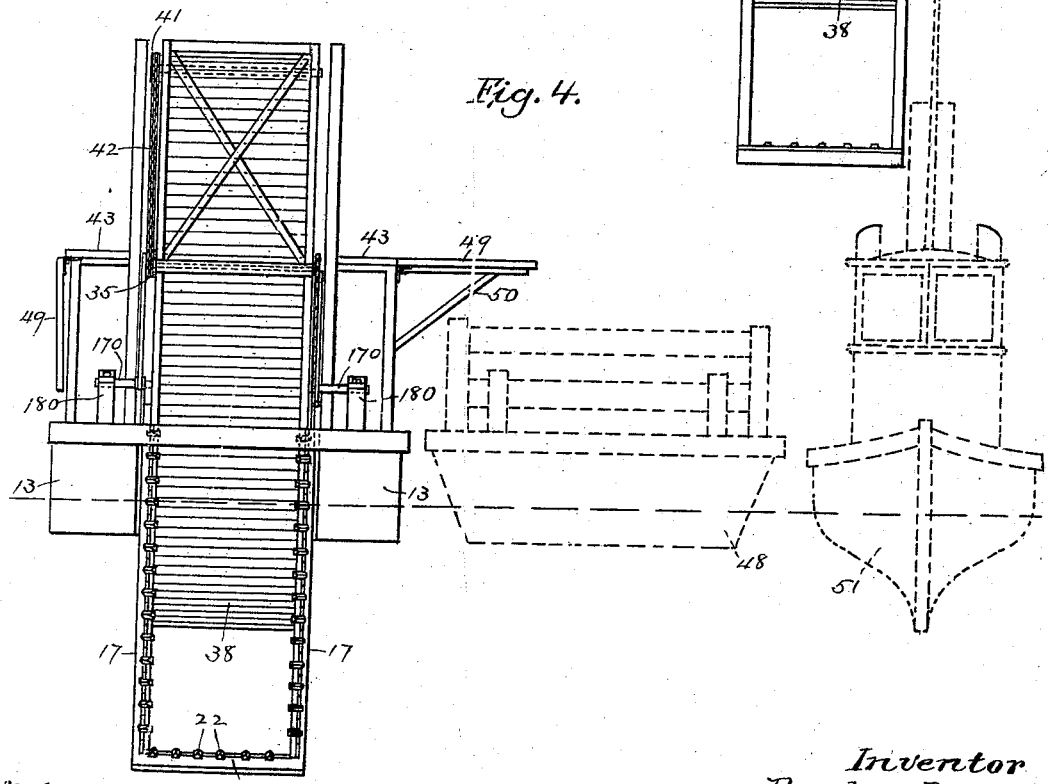

Of the accompanying drawings forming a part of this specification: Figure 1 represents a side view of a marine harvester embodying my invention, the cutting mechanism and the conveyer being shown raised from the water and stored inoperatively on the support; Fig. 2 represents a view similar to Fig. 1, showing the cutting mechanism and conveyer in their operative positions, and also showing a supplemental surface cutter; Fig. 3 represents a rear end elevation of the harvester; Fig. 4 represents a front end elevation of the same; Fig. 5 represents a top plan view; Fig. 6 represents a fragmentary perspective view, showing the preferred form of cutting mechanism and a portion of the conveyer.

The same reference characters indicate the same parts in all the figures.

In the drawings 12 represents a floating support which may be of the general form of an ordinary scow or flat boat, or of any other suitable form and construction adapted to sustain the cutting mechanism, the conveyer, the motor and other coöperating parts hereinafter described. For convenience I will hereinafter refer to the vessel as the floating support.

I will now proceed to describe the preferred construction of the cutting mechanism, the conveyer and other essential parts, it being understood, however, that the construction here shown is adopted for purposes of illustration and may be variously modified within the scope of the appended claims without departing from the spirit of the invention.

The support 12 is provided with two longitudinal extensions 13 separated by an intervening space 14, Fig. 5, in which the cutting mechanism and parts of the conveyer hereinafter described are movable from a position above the support, as shown by Fig. 1, to the operative position shown by Fig. 2, the extensions 13 being preferably connected by a cross-tie or girder 15 at their outer ends.

16 represents the longitudinal side members of a trussed frame. These members are provided with lateral trunnions 170, which are journaled in bearing blocks 180 on the support 12 and are adapted to occupy the horizontal position shown by Fig. 1 or the inclined position shown by Fig. 2. Said frame includes trussed members 17, 18, 19 and 20, preferably relatively arranged as shown, the whole constituting a stiff and rigid frame adapted to be easily moved from either of the positions shown to the other. The trussed frame supports the cutting mechanism and the conveyer hereinafter described, and when inclined as shown by Fig. 2 holds the cutting mechanism in position to act below the water level, the lower portion of the conveyer being also submerged while its upper portion is elevated above the water level.

The cutting mechanism preferably includes a bar 21 corresponding to the bar of a mowing machine and attached to the forward ends of the frame members 16, said bar being provided with guard fingers 22 adapted to coöperate with angular knives 23 on a cutter bar 24 resembling that of a mowing machine. The finger and cutter bars are horizontally arranged and are adapted to cut horizontally through a growth of kelp or other marine vegetation at a suitable distance below the surface of the water. The said finger bar 21 and cutter bar 24 may constitute the entire cutting mechanism; but I prefer to associate therewith two duplicate vertical finger and cutter bars, the vertical finger bars being formed by the truss members 17 and provided with guard fingers 25 which coöperate with angular cutting knives 26 on vertical cutter bars 26$^a$ which are movable on the finger bars 17. In this embodiment of the invention the vertical cutter bars 26$^a$ are employed to communicate reciprocating motion to the horizontal cutter bars 24, the vertical cutter bars being reciprocated by mechanism carried by the truss frame and flexibly connected by chains 27 with the horizontal cutter bar, said chain passing under guide pulleys 280.

270 represents a shaft journaled in bearings at the upper ends of the members 17 of the truss frame and provided with wheels or disks 28 having eccentric wrist pins 29 which are connected by pitmen 30 with the vertical cutter bars 26$^a$, the wrist pins and pitmen being so arranged that the cutter bars 26$^a$ are moved simultaneously in opposite directions, so that they pull alternately on and reciprocate the horizontal cutter bar 24 through the chains 27. The shaft 270 is rotated by power transmitted from a gasolene engine 31 or other motor through a sprocket chain 32, a sprocket wheel 33 affixed to a transverse shaft the ends of which form the trunnions 170 (said shaft extending across the truss frame and being provided with additional sprocket wheels 34 and 35), and a sprocket chain 36 connecting the wheel 34 with the wheel 28, which also has sprocket teeth. The described connection between the motor and the cutting mechanism is unaffected by changes in the position of the truss frame, so that the cutter bars may be reciprocated when the frame is in different positions, and are always operatively connected with the motor.

38 represents the conveyer composed of an endless band running on rolls 39 and 40 journaled in bearings on the truss frame, and provided with spurs or teeth 38$^a$ adapted to engage the material detached by the cutters. The roll 40 has a sprocket wheel 41 attached to its shaft, this being connected by a chain 42 with the sprocket wheel 35. The conveyer is therefore positively driven, its outer stretch being moved upwardly and its lower portion being submerged and in position to engage the floating detached material. The conveyer is inclined as shown by Fig. 2, and the material elevated by it is deposited on a platform 43 located at the rear portion of the support.

The truss frame is provided with guards 44 at opposite edges of the conveyer to prevent the material being raised from escaping laterally, said guards being preferably elongated sheet metal strips forming sides of a trough or passage of which the outer stretch of the conveyer band forms a moving bottom. The lower portions of said guards are preferably supplemented by extensions 45 which may be triangular sheets of woven wire, attached to the guards 44, the frame members 17, and to braces 46 extending between the frame members 16 and 17. The function of the extensions 45 is to prevent the material below the surface of the water from floating laterally over the guard 44, the foraminous construction of the extensions permitting water to pass freely through them.

The platform 43 on which the elevated material is deposited is preferably elevated considerably above the water level, so that the deposited material may be conveniently pitched off into a scow 48 beside the support 12. The platform preferably has hinged extensions 49 at opposite edges, and movable supports 50 adapted to sustain the extensions horizontally, each extension being adapted to drop to a vertical position as shown by Figs. 3 and 4. One or more men stationed on the platform can readily pitch the material therefrom into the receiving scow, which is made fast to one side of the support 12.

A tug boat 51 may be employed to move the outfit through the water, the receiving scow being preferably interposed between the tug and the support 12, so that the propeller of the tug is not liable to be fouled by the material in the water, the tug being at one side of the field of material being cut.

To the cutting mechanism may be added supplemental vertical surface cutters 52, movable in vertical guides on the support extension 13, and adapted to cut both below and above the water level, to sever parts of the material, which might not be reached by the cutters 26. The cutters 52 may be reciprocated by levers or walking beams 53 pivoted at 54 and connected directly with the vertical cutters 26 and by rods with the cutters 52.

The described apparatus is intended particularly for harvesting kelp in places where it grows from a bottom of considerable depth to the surface of the water, as on the northern parts of the Pacific coast. The kelp, which is valuable as a fertilizer, grows luxuriantly and its stems and leaves become densely tangled at and near the surface of the water so that in many places vertical cutting is necessary to detach from the main field the surface portions to be removed. The vertical cutters are therefore very important when the surface growth is tangled or matted. When this is not the case the vertical cutters are not required, and the horizontal cutter may be used alone, and may be reciprocated by plain slides substituted for the vertical cutters or cutter bars 26ª, and connected with the horizontal cutter by the chains 27. In the interests of conservation it is very desirable that the removed kelp be detached above the roots and without exerting a strain on the stalks liable to uproot them, the best practice being to cut off the stalks about eight feet below the water level in order that they may again grow to the surface. By cutting the tangled matter vertically at the edges of the horizontal cut I enable the detached material to be easily withdrawn from the water by the conveyer, without strain on the roots of any stalk that may be involved in the tangled portions.

The conveyer band is preferably composed of transverse slats flexibly connected, the teeth being secured to the slats.

The harvesting outfit when in operation is generally moved against the tide along one edge of a kelp bed or field, the receiving scow being interposed between the field and the tug. When the work is completed the levers 53 are disconnected from the operating means on the truss frame, and said frame is swung to the horizontal position shown by Fig. 1, the support 12 being then in condition to be towed to shore.

I prefer to locate an inclined deflector 58 under the delivering portion of the conveyer, to deflect the material laterally onto the platform 43. There are preferably two of these platforms, one at the port and the other at the starboard side, so that the deflector is adjustable and adapted to guide the material onto either platform, as shown by full and dotted lines in Fig. 3.

I claim:

1. The combination with a marine vessel, of harvesting mechanism movably supported thereby to cut material below the surface of the water, means for elevating the submerged material cut by the harvesting mechanism, and means for respectively submerging or raising said harvesting mechanism and said elevating means.

2. The combination with a marine vessel, of a frame pivotally supported by said vessel to cut material below the surface of the water, harvesting mechanism carried by said frame, means carried by said frame for elevating the submerged material cut by the harvesting mechanism, and means for rocking said frame to respectively submerge or raise said harvesting mechanism and said elevating means.

3. The combination with a marine vessel, of a movable frame supported thereby, harvesting mechanism movably supported by said frame to cut material below the surface of the water, a conveyer also carried by said frame for elevating the submerged material cut by the harvesting mechanism, and means for moving said frame to respectively submerge or raise said harvesting mechanism.

4. The combination with a marine vessel, of harvesting mechanism supported thereby, means for elevating the submerged material cut by the harvesting mechanism, and means for simultaneously submerging or elevating said harvesting mechanism and the receiving end of said elevating mechanism.

5. The combination with a marine vessel, of a movable frame supported thereby, harvesting mechanism carried by said frame to cut material below the surface of the water, a conveyer also carried by said frame for elevating the submerged material cut by the harvesting mechanism, and means for moving said frame to respectively submerge or raise said harvesting mechanism and said conveyer, a motor, connections between the motor and cutting mechanism having provisions for imparting movement to the cutting mechanism when the frame is in different positions.

6. In a marine harvester the combination of a floating support, a substantially horizontal submerged cutter, substantially vertical cutters at opposite edges of the path of the horizontal cutter, means for operating said vertical cutters, and means operated by said vertical cutters for simultaneously operating said horizontal cutter.

7. In a marine harvester the combination of a floating support, a substantially horizontal submerged cutter, substantially vertical cutters at opposite edges of the path of the horizontal cutter, means for reciprocating the vertical cutters simultaneously in opposite directions, and flexible connections between the vertical cutters and the horizontal cutter.

8. In a marine harvester the combination of a floating support, a frame pivoted thereon and adapted to be submerged at one end, a substantially horizontal cutter carried by the frame, sliding members movable on the frame at right angles with the horizontal cutter, means for simultaneously reciprocating said members in opposite directions, and flexible connections between said members and the horizontal cutter.

9. In a marine harvester the combination of a floating support, a substantially horizontal submerged cutter, substantially vertical cutters at opposite edges of the path of the horizontal cutter, a pivoted frame carrying said cutters, and means partly carried by said frame for reciprocating the vertical cutters, and means operated by the vertical cutters for reciprocating the horizontal cutter.

10. In a marine harvester the combination of a floating support, submerged cutting mechanism, a partly submerged conveyer adapted to raise material severed by the cutting mechanism, means for submerging and raising said cutting mechanism and conveyer, and an elevated platform on the support adapted to receive the material deposited by the conveyer.

11. In a marine harvester the combination of a floating support, submerged cutting mechanism, a partly submerged conveyer adapted to raise material severed by the cutting mechanism, and an elevated platform on the support adapted to receive the material deposited by the conveyer, said platform having a hinged extension and movable means for supporting said extension in an operative position.

12. In a marine harvester the combination of a floating support having spaced apart extensions at one end, a frame pivoted on the body of the support and adapted to swing downwardly between said extensions, cutting mechanism carried by said frame, and a conveyer carried by said frame, supplemental cutters carried by said extensions, a motor, and connections between the motor and the cutting mechanism and conveyer, said connections being carried in part by the frame.

13. In a marine harvester the combination of a floating support, a frame pivoted thereon, cutting mechanism and an endless conveyer carried by the frame, guards also carried by the frame at opposite edges of the operative stretch of the conveyer, and means for rocking said frame to place the cutting mechanism and conveyer in operative or inoperative position.

14. The combination with a marine vessel, of harvesting mechanism supported thereby, means for elevating the submerged material cut by the harvesting mechanism, means for moving said harvesting mechanism and said elevating means into operative and inoperative positions respectively, and guards coöperating with said elevating mechanism to prevent the harvested material from floating laterally while submerged.

15. In a marine harvester the combination of a floating support, a substantially horizontal submerged cutter, substantially vertical cutters at opposite edges of the path of the horizontal cutter, supplemental vertical cutters in advance of the first mentioned vertical cutters, and means for simultaneously operating said cutters.

In testimony whereof I have affixed my signature, in presence of two witnesses.

REUBEN BROOKS.

Witnesses:
E. BATCHELDER,
P. W. PEZZETTI.

Copies of this patent may be obtained for five cents each, by addressing the "Commissioner of Patents, Washington, D. C."